Figure 1:
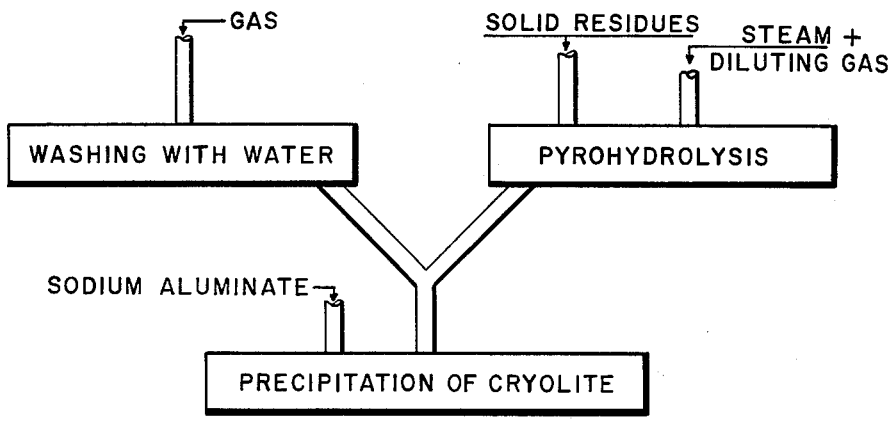

Aug. 3, 1965     P. MOLLARD ETAL     3,198,600

PROCESS FOR RECOVERING FLUORINE

Filed July 28, 1961

INVENTORS.
Paul Mollard
Gilbert Turpin
BY

THEIR ATTORNEYS 3,198,600
PROCESS FOR RECOVERING FLUORINE
Paul Mollard, Sainte-Foy-les-Lyon, and Gilbert Turpin, Paris, France, assignors to Societe d'Electro-Chimie d'Electro-Metallurgie et des Acieries Electriques d'Ugine, Paris, France, a corporation of France
Filed July 28, 1961, Ser. No. 127,635
Claims priority, application France, Aug. 10, 1960, 835,447
7 Claims. (Cl. 23—88)

It is known that the manufacture of aluminum by igneous electrolysis of fluoride baths containing alumina in solution is accompanied, at the anode, by a release of gases formed mainly of carbonic gas, carbon oxide and fluoride gases. The composition of these fluoride gases varies according to the nature of the utilized baths and anodes; in the case of Söderberg anodes with vertical current lead-ins, the content of hydrofluoric acid is relatively high. Furthermore, sulphurous gas is present in non-negligible quantity.

For reasons of health and safety, it is necessary to avoid releasing these gases freely into the atmosphere. For this purpose, they are often burned at the outlet of the electrolysis cells, or the solid particles carried along are extracted therefrom, particularly by means of electrostatic precipitation, or even they are successfully subjected to both operations. These gases are then washed, either with alkaline solutions, or with water, in order to obtain particularly the hydrofluoric acid.

It has been attempted to recover in a valuable form, the fluorine contained in those gases. The most valuable form appears to be cryolite, which presents the advantage of being directly recyclable to the cells, under the condition, however, that this product does not contain certain harmful impurities, such as sulphates.

Numerous processes were proposed and patented for this purpose, particularly the following:

Washing of the gases with water and neutralizing of the acid solutions with a sodium aluminate solution to precipitate cryolite.

Washing of the gases with a sodium carbonate solution and precipitation of the cryolite by addition of a soluble aluminum fluoride.

Washing of the gases with a sodium carbonate solution and precipitation of the cryolite by addition of sodium aluminate and injection of carbonic gas or a bicarbonated solution.

Besides the recovery of fluorine from the gases by washing of the gases, processes for treating the various solid residues issuing from the cells of the aluminum production have been studied. For this purpose:

It was proposed to treat the scraping residues and the cathodic residues of the cells, the dusts or the muds retained by the electrostatic precipitators, by a prolonged digestion or in an autoclave, with alkaline solutions so as to obtain solutions of sodium fluoride and sodium aluminate containing an excess of alkali.

It was also suggested to heat under vacuum at high temperature these various fluoride residues in order to distill therefrom the fluorides and the cryolite.

Numerous published works have pointed out the possibility, in a method for the quantitative analysis of fluorine in fluorine compounds, of effecting a liberation of gaseous hydrofluoric acid by pyrohydrolysis of fluorine compounds. This pyrohydrolysis is carried out in the absence of air and in the presence of a very great excess of steam. The fluorine extraction yield, which must be as near 100% as possible, is reached with temperatures variable according to the nature of the fluorine compound to be analyzed. This temperature must be at least equal to 1000° C., but it is necessary to reach 1200° C. if it is desired to analyze correctly all the fluorine compounds (except $CaF_2$) and it is necessary to utilize a very high amount of steam, ranging from about 300 to 400 grams per gram of fluorine. Such requirements involve expenses bearable in a process of analyzing for fluorine, but which are too costly, in comparison with the value of the fluorine to be recovered, to be used industrially in processes for recovering fluorine.

The products obtained by these various processes, either hydrofluoric acid or fluorides, may then be transformed into cryolite.

The recovery of fluorine contained in the gases, whatever be the method used, is an operation currently performed and generally economical. On the contrary, the recovery in valuable form of the fluorine contained in the dusts separated from the gases, in the scraping residues and in the cathodic residues of the cells has only been realized partially up to the present on an industrial scale.

The applicants have sought to improve the total yield of recovering fluorine from the whole of the solid and gaseous residues in question, and its recovery in the form of cryolite, by a process involving the use of known methods of treating gaseous residues.

The present invention relates to a process of recovering, in the form of cryolite, the fluorine issuing from the cells of aluminum production, which consists in adding hydrofluoric acid obtained by pyrohydrolysis of the solid residues resulting from the working of these cells to the solutions resulting from the washing of the gases leaving these same cells, and then to precipitate cryolite by any known means from the solutions resulting from this addition.

Figure 2:
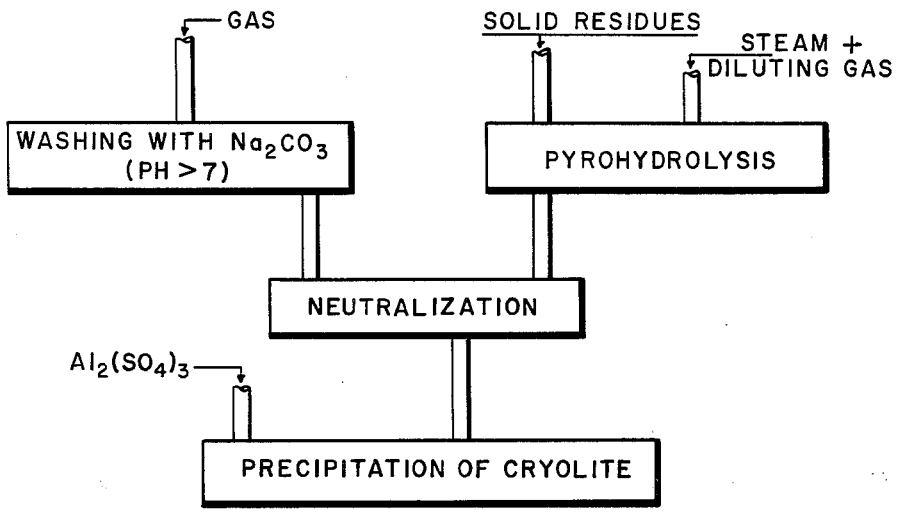

In the accompanying drawings which are flow sheets illustrating two embodiments of the invention:

FIGURE 1 illustrates washing the gas with water; and
FIGURE 2 illustrates washing the gas with an alkaline solution.

Said process may be carried out as follows:

(1) One carries out a pyrohydrolysis, in the presence of a mixture of steam and a diluting gas, for example, air, of the soots resulting from the removing of dust from the gases, from the scraping residues or the cathodic residues of the cells. This pyrohydrolysis is carried out according to the process disclosed in the applicants' U.S. Patent 3,073,676, issued January 15, 1963, for Process of Recovering Fluorine From Solid Residues by Pyrohydrolysis. According to that patent, a quantity of the soots preferably previously formed into balls, is heated to a temperature of about 600 to 1100° C. and a mixture of steam and a diluting gas devoid of effect on the liberated hydrofluoric acid is flowed therethrough. As diluting gas, air, oxygen, nitrogen, etc., for example, may be employed. Air is, however, the most economical gas. The mixture of steam and diluting gas contains, by volume, about 25 to 75% of steam and about 75 to 25% of diluting gas. The greatest part of fluorine contained in these solid residues is thus recovered in the form of hydrofluoric acid, according to the reactions:

$$2AlF_3 + 3H_2O \rightarrow 6HF + Al_2O_3$$
$$2NaF + Al_2O_3 + H_2O \rightarrow 2HF + 2NaAlO_2$$

(2) Said hydrofluoric acid, in gaseous form or in solution, is added:

(a) Either to the acid solutions obtained by washing the gases with water after removing dust from the gases;

(b) Or to the alkaline solutions obtained by washing these gases with sodium carbonate solutions. It is known that such a washing gives a sodium fluoride solution more or less bicarbonated. The hydrofluoric acid issuing from the pyrohydrolysis of the solid residues neutralizes the alkaline solution of sodium fluoride and sodium bicarbonate according to the reaction:

(3) The cryolite is then precipitated in known manner:
(a) Either by sodium aluminate if the washing of the gases with water and the process (2a) were used;
(b) Or by aluminum sulphate if the alkaline washing of the gases and the process (2b) were used. This process corresponds, as is known, to the reaction:

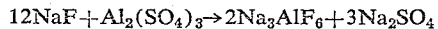

The process according to the invention allows one to recover from the various residues of the electrolysis, in the form of cryolite, a quantity of fluorine at least twice that which can be recovered by washing only the gases after removing the dust.

Experience has shown that it is possible in the process of the invention to obtain a filterable cryolite by carrying out its precipitation according to the process disclosed in applicants' French Patent 1,187,352 and their additional patent filed September 24, 1959.

The acid solutions recovered by washing the gases issuing from the cells with water or by pyrohydrolysis of the solid residues do not contain sulphur derivatives and consequently the cryolite precipitated from these solutions does not contain them. On the contrary, the alkaline washing gives solutions with a high content in ions $SO_4$ and a cryolite precipitated according to (3b) of the invention presents generally a high sulphate content. The applicants have however noted that in carrying out this precipitation according to the process disclosed in French Patent 1,187,352 and their additional patent filed September 24, 1959, the obtained cryolite may contain less than 1.5% of $SO_4$, which renders it directly utilizable for feeding the electrolysis cells of the aluminum production. It is thus possible in the process of the invention to wash the gases at a pH superior to 7, which allows one to avoid corrosion of apparatus made of ordinary steel and to obtain a filterable cryolite having a low sulphur content.

The following example illustrates the process according to FIGURE 2.

*Example (1)*

The gases issuing from the electrolysis cells were washed with a sodium carbonate solution thereby obtaining 35 m.$^3$ of a solution containing, per liter:

| | g. |
|---|---|
| $NaHCO_3$ | 10 |
| $Na_2CO_3$ | 2 |
| NaF | 35 |

This solution contained 550 kg. of fluorine. A batch of soots was collected by electrostatic precipitation of solids from the gases issuing from aluminum electrolysis cells, this batch containing 350 kg. of fluorine and having the following average analysis:

| | Percent |
|---|---|
| F total | 19 |
| Iron total | 1.75 |
| S total | 2.85 |
| Tars | 48 |
| Carbon | 4.2 |

The batch of soots, previously formed into balls, was charged on the grate of a vertical tube furnace, traversed by a rising current of air with a constant feed of 10,000 m.$^3$/h. (calculated at the normal conditions 0° C. and 760 mm. Hg). When the temperature of the charge had reached 500 to 600° C., steam was admitted into the current of air, at a rate of 3,300 m.$^3$ vapor/h. (calculated at the normal conditions 0° C. and 760 mm. Hg), which corresponded to a proportion of 25% steam and 75% of air, by volume, in the gases flowing through the charge. The charge was maintained at 1000° C. for one hour while flowing this mixture of steam and air through it. Under these conditions, there was obtained a dilute solution of hydrofluoric acid containing 30 g. HF/1, with a fluorine recovery yield of 70% and a water consumption of 22 kg./kg. of the fluorine recovered. The dilute solution of hydrofluoric acid thus obtained contained 245 kg. of fluorine in the form of HF. Since only 105 kg. of fluorine in the form of a hydrofluoric acid solution were required for neutralizing the above-mentioned alkaline solution, a portion only of the dilute hydrofluoric acid solution was used for neutralizing the above-mentioned alkaline solution and the excess was set aside. This excess can be used for precipitating cryolite in an acid process.

The sodium fluoride solution obtained by the preceding neutralization was treated with an aluminum sulphate solution to precipitate cryolite.

*Example (2)*

According to FIGURE 1, the gases issuing from the electrolysis cells were washed with water thereby obtaining 35 m.$^3$ of a solution containing, per liter:

| | g. |
|---|---|
| HF | 15 |

500 kg. of fluorine were retained by this washing and at the electrofilters 350 kg. of fluorine were collected in soots having the following average analysis:

| | Percent |
|---|---|
| F total | 19 |
| Iron | 1.75 |
| S total | 2.85 |
| Tars | 48 |
| Carbon | 4.2 |

The batch of soots, previously formed into balls, was charged on the grate of a vertical tube furnace, traversed by a rising current of air with a constant feed of 10,000 m.$^3$/h. (calculated at the normal conditions 0° C. and 760 mm. Hg). When the temperature had reached 500 to 600° C., steam was admitted into the current of air, at the rate of 3,300 m.$^3$ vapor/h. (calculated at the normal conditions 0° C. and 760 mm. Hg), which corresponded to a proportion of 25% steam in the gases flowing through the charge. The charge was maintained at 1000° C. for one hour while flowing the mixture of steam and air through it. Under these conditions, there was obtained a dilute solution of hydrofluoric acid containing 30 g. HF/1, with a fluorine recovery yield of 70% and a water consumption of 22 kg./kg. of the fluorine recovered.

There was thus obtained 245 kg. of fluorine in the form of HF recovered by treatment of the soots, which, when added to the 500 kg. of fluorine collected from the gases, gave a total of 745 kg. of fluorine in the form of HF solution.

This solution was treated with sodium aluminate to precipitate cryolite.

We claim:

1. A process for recovery of fluorine in the form of cryolite comprising washing gases containing fluorine to form a solution, at substantially atmospheric pressures heating to a temperature of about 600° C.–1100° C. solid residues which contain fluorine and which result from electrolytic production of aluminum, then flowing through said residues a mixture of steam and a diluting gas devoid of effect on liberated hydrofluoric acid to obtain hydrofluoric acid, adding said hydrofluoric acid to said solution and precipitating cryolite from said soluton by addng an aluminum salt thereto, said gases containing fluorine being those which issue from cells used in the electrolytic production of aluminum.

2. The process of claim 1 wherein said mixture contains by volume about 25% to 75% steam and 75% to 25% diluting gas and wherein said diluting gas is air.

3. In a process for recovery of fluorine in the form of cryolite comprising washing gases containing fluorine with water to form a first hydrofluoric acid solution, at substantially atmospheric pressure heating at a temperature of about 600° C.–1100° C. solid residues which contain fluorine and which result from electrolytic production of aluminum, then flowing through said residues a mixture of steam and a diluting gas devoid of effect on liberated hydrofluoric acid to form a second hydrofluoric solution, combining said first and second hydrofluoric acid solutions, precipitating cryolite from said combined solutions by adding an aluminum salt thereto, said gases containing fluorne being those which issue from cells used in the electrolytic production of aluminum.

4. The process of claim 3 wherein the said mixture contains by volume about 25% to 75% steam and 75%–25% diluting gas and wherein said diluting gas is air.

5. A process for recovery of fluorine in the form of cryolite comprising washing gases containing fluorine with a sodium carbonate solution to produce a solution containing sodium fluoride and sodium bicarbonate, at substantially atmospheric pressure heating at a temperature of about 600° C.–1100° C. solid residues which contain fluorine and which result from electrolytic production of aluminum, then flowing through said residues a mixture of steam and a diluting gas devoid of effect on liberated hydrofluoric acid to form hydrofluoric acid, neutralizing said solution containing sodium fluoride and sodium bcarbonate by mixing it with said hydrofluoric acid and precipitating cryolite from said neutralized soluton by addng an aluminum salt thereto, said gases containing fluorine being those which issue from cells used in the electrolytic production of aluminum.

6. The process of claim 5 wherein said mixture contains by volume about 25%–75% steam and 75%–25% diluting gas and wherein said diluting gas is air.

7. The process of claim 6 wherein said aluminum salt is aluminum sulphate.

References Cited by the Examiner

UNITED STATES PATENTS

| 167,986 | 9/75 | Burgess | 23—153 X |
| 660,094 | 10/00 | Doremus | 23—153 |
| 2,031,554 | 2/36 | Torchet | 23—88 |
| 2,692,186 | 10/54 | Kamlet | 23—88 |
| 2,813,000 | 11/57 | Quittenton | 23—88 X |
| 2,858,198 | 10/58 | McGeer et al. | 23—88 X |
| 2,943,914 | 7/60 | Moser | 23—88 |

OTHER REFERENCES

Mellor: "Comprehensive Treatise on Inorganic and Theoretical Chemistry," vol. 2, page 127 (1922); vol. 5, page 301 (1924).

MAURICE A. BRINDISI, *Primary Examiner.*

GEORGE D. MITCHELL, *Examiner.*